United States Patent [19]

Parton et al.

[11] Patent Number: 5,091,298
[45] Date of Patent: Feb. 25, 1992

[54] SENSITIZING DYES FOR PHOTOGRAPHIC MATERIALS

[75] Inventors: Richard L. Parton, Webster; Steven G. Link, Rochester; David A. Stegman, Churchville; John D. Mee, Rochester, all of N.Y.

[73] Assignee: Eastman Kodak Company, Rochester, N.Y.

[21] Appl. No.: 554,649

[22] Filed: Jul. 19, 1990

[51] Int. Cl.$^5$ .............................................. G03C 1/12
[52] U.S. Cl. ................................... 430/570; 430/582; 430/583; 430/591; 430/593; 430/594; 430/595
[58] Field of Search ............... 430/582, 583, 593, 570, 430/591, 595, 594

[56] References Cited

U.S. PATENT DOCUMENTS

| | | | |
|---|---|---|---|
| 3,667,960 | 6/1972 | Shiba et al. | 430/582 |
| 3,718,475 | 2/1973 | Shiba et al. | 430/574 |
| 4,914,002 | 4/1990 | Inoue et al. | 430/264 |
| 4,942,120 | 7/1990 | King et al. | 430/567 |

OTHER PUBLICATIONS

Research Disclosure, item No. 10605, Feb. 1973.

Primary Examiner—Charles L. Bowers, Jr.
Assistant Examiner—Janet C. Baxter
Attorney, Agent, or Firm—Andrew J. Anderson

[57] ABSTRACT

Dyes according to formulas (I), (II), (III), (IV), and (V) below are described. The dyes are useful as low-staining sensitizing dyes for photographic materials.

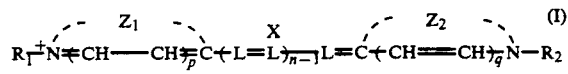

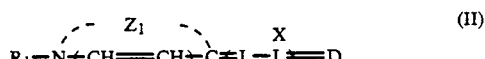

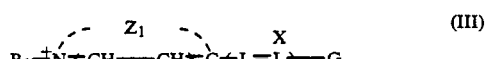

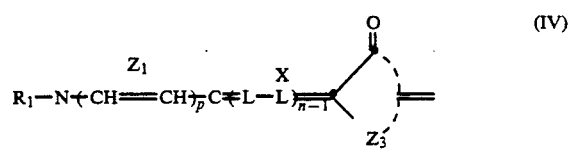

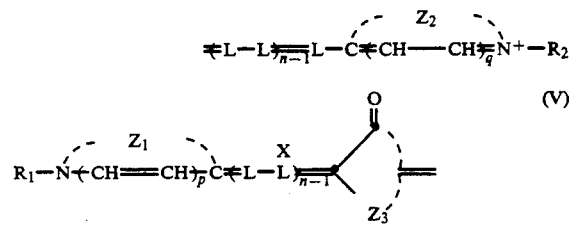

$Z_1$, $Z_2$, $Z_3$, $R_1$, $R_2$, L, D, G, X, n, P, and q are defined herein.

8 Claims, No Drawings

SENSITIZING DYES FOR PHOTOGRAPHIC MATERIALS

FIELD OF THE INVENTION

This invention relates to dyes and their use as sensitizers for photographic materials.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared-sensitive element, a spectral sensitizing dye is required. Sensitizing dyes are chromophoric compounds (usually cyanine dye compounds) that are adsorbed to the silver halide. They absorb light or radiation of a particular wavelength and transfer the energy to the silver halide to form the latent image, thus effectively rendering the silver halide sensitive to radiation of a wavelength other than the blue intrinsic sensitivity. Sensitizing dyes can also be used to augment the sensitivity of silver halide in the blue region of the spectrum.

During processing of color photographic materials, the silver halide is removed from the material. With black and white materials, the silver halide that was not exposed is removed. In either case, it is desirable to remove the sensitizing dye as well. Sensitizing dye that is not removed tends to cause retained dye stain, which adversely affects the image recorded in the photographic material. The problem of retained sensitizing dye stain is further aggravated by the increasing use of tabular grain emulsions and high chloride emulsions. Tabular grain emulsions have a high surface area per mole of silver, which can lead to higher levels of sensitizing dye and thus, higher levels of retained sensitizing dye stain. High chloride emulsions necessitate the use of sensitizing dyes having enhanced adsorption to silver halide, which can also lead to higher levels of dye stain. High chloride emulsions are also often subjected to rapid processing, which can aggravate dye stain problems.

It is thus an object of this invention to provide new dye compounds useful as photographic sensitizers exhibiting comparatively low dye stain.

SUMMARY OF THE INVENTION

The present invention provides dyes according to formulas (I), (II), (III), (IV), or (V) below:

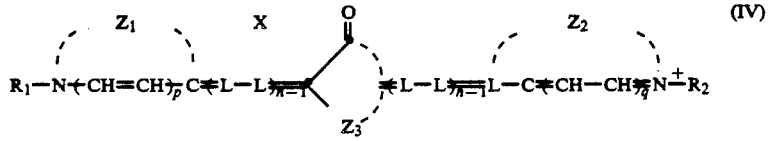  (I)

According to formula (I):

$Z_1$ and $Z_2$ each independently represents the atoms necessary to complete a substituted or unsubstituted heterocyclic nucleus, each L independently represents a substituted or unsubstituted methine group, n is a positive integer of from 1 to 4, p and q each independently represents 0 or 1, X represents a cation as needed to balance the charge of the molecule, and $R_1$ and $R_2$ each independently represents substituted or unsubstituted alkyl or substituted or unsubstituted aryl, and at least one of $R_1$ and $R_2$ is represented by the formula:

wherein

L′ represents a substituted or unsubstituted divalent linking group comprising about 1 to 6 carbon atoms, L″ represents a substituted or unsubstituted divalent linking group comprising about 1 to 6 carbon atoms, and R represents H, substituted or unsubstituted alkyl, or forms a ring structure with L′ or L″.

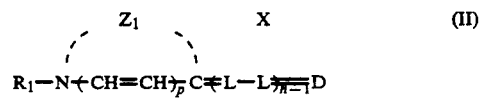  (II)

In formula (II), $R_1$, $Z_1$, L, p, n, and X are as defined for formula (I), and =D represents:

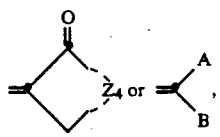

wherein $Z_4$ represents the atoms necessary to complete a substituted or unsubstituted heterocyclic nucleus, and A and B each indenpendently represents a cyano radical, an ester radical, an acyl radical, a carbamoyl radical, or an alkylsulfonyl radical.

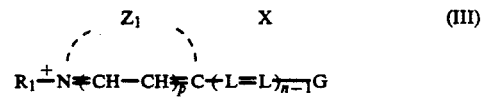  (III)

In formula (III), $R_1$, $Z_1$, L, p, n, and X are as defined for formula (I), and G represents a substituted or unsubstituted amino radical or a substituted or unsubstituted aryl radical.

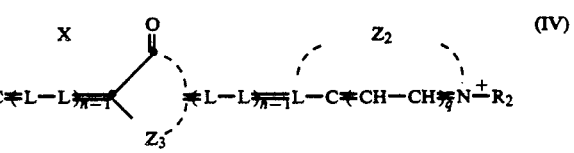  (IV)

In formula (IV), $R_1$, $R_2$, $Z_1$, $Z_2$, L, p, q, n, and X are as defined for formula (I).

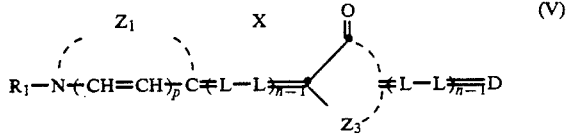

$$\text{(V)}$$

In formula (V), $R_1$, $Z_1$, L, D, p, n, and X are as defined for formula (II) above. $Z_3$ is defined the same as $Z_4$ in formula (II) above.

The dyes of formulas (I) (II), (III), (IV), and (V) are stable structures that are effective sensitizers for silver halide photographic materials. Photographic materials comprising silver halide sensitized with at least one dye chosen from formulas (I), (II), (III), (IV), or (V) exhibit reduced dye stain compared to materials sensitized with many prior art dyes.

DESCRIPTION OF THE PREFERRED EMBODIMENTS

In the above formulas, $Z_1$ and $Z_2$ each independently represents the atoms necessary to complete a substituted or unsubstituted 5- or 6-membered heterocyclic nucleus. These include a substituted or unsubstituted: thiazole nucleus, oxazole nucleus, selenazole nucleus, quinoline nucleus, tellurazole nucleus, pyridine nucleus, thiazoline nucleus, indoline nucleus, oxadiazole nucleus, thiadiazole nucleus, or imidazole nucleus. This nucleus may be substituted with known substituents, such as halogen (e.g., chloro, fluoro, bromo), alkoxy (e.g., methoxy, ethoxy), substituted or unsubstituted alkyl (e.g., methyl, trifluoromethyl), substituted or unsubstituted aryl, substituted or unsubstituted aralkyl, sulfonate, and others known in the art.

In one embodiment of the invention, when dyes according to formula (I) are used $Z_1$ and $Z_2$ each independently represent the atoms necessary to complete a substituted or unsubstituted thiazole nucleus, a substituted or unsubstituted selenazole nucleus, a substituted or unsubstituted imidazole nucleus, or a substituted or unsubstituted oxazole nucleus.

Examples of useful nuclei for $Z_1$ and $Z_2$ include: a thiazole nucleus, e.g., thiazole, 4-methylthiazole, 4-phenylthiazole, 5-methylthiazole, 5-phenylthiazole, 4,5-dimethyl-thiazole, 4,5-diphenylthiazole, 4-(2-thienyl)-thiazole, benzothiazole, 4-chlorobenzothiazole, 5-chlorobenzothiazole, 6-chlorobenzothiazole, 7-chlorobenzothiazole, 4-methyl-benzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naptho[1,2-d]thiazole, 5-methoxynaphtho[2,3-d]thiazole, 5-ethoxynaphtho[2,3-d]thiazole, 8-methoxynaphtho[2,3-d]thiazole, 7-methoxy-naphtho[2,3-d]thiazole, 4'-methoxythianaphtheno-7',6'-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole 5-ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2-d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, etc.; a tellurazole nucleus, e.g., benzotellurazole, naphtho[1,2-d]benzotellurazole, 5,6-dimethoxybenzotellurazole, 5-methoxybenzotellurazole, 5-methylbenzotellurazole; a thiazoline nucleus, e.g., thiazoline, 4-methylthiazoline, etc; a benzimidazole nucleus, e.g., benzimidazole, 5-trifluoromethylbenzimidazole, 5,6-dichlorobenzimidazole; an indole nucleus, 3,3-dimethylindole, 3,3-diethylindole, 3,3,5-trimethylindole; or a diazole nucleus, e.g., 5-phenyl-1,3,4-oxadiazole, 5-methyl-1,3,4-thiadiazole.

A and B are each a cyano radical, an ester radical such as ethoxy carbonyl, methoxycarbonyl, etc., an acyl radical, a carbamoyl radical, or an alkylsulfonyl radical such as ethylsulfonyl, methylsulfonyl, etc. Examples of useful nuclei for $Z_4$ include a 2-thio-2,4-oxazolidinedione nucleus (i.e., those of the 2-thio-2,4-(3H,5H)-oxazoledione series) (e.g., 3-ethyl-2-thio-2,4 oxazolidinedione. 3-(2-sulfoethyl)-2-thio-2,4-oxazolidinedione, 3-(4-sulfobutyl)-2-thio-2,4-oxazolidinedione, 3-(3-carboxypropyl)-2-thio-2,4-oxazolidinedione, etc.); a thianaphthenone nucleus (e.g., 2-(2H)-thianaphthenone, etc.), a 2-thio-2,5-thiazolidinedione nucleus (i.e., the 2-thio-2,5-(3H,4H)-thiazoledione series) (e.g., 3-ethyl-2-thio-2,5-thiazolidinedione, etc.); a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.); a thiazolidinone nucleus (e.g., 4-thiazolidinone, 3-ethyl-4-thiazolidinone, 3-phenyl-4-thiazolidinone, 3-α-naphthyl-4-thiazolidinone, etc.); a 2-thiazolin-4-one series (e.g., 2-ethylmercapto-2-thiazolin-4-one, 2-alkylphenylamino-2-thiazolin-4-one, 2-diphenylamino-2-thiazolin-4-one, etc.,) a 2-imino-4-oxazolidinone (i.e., pseudohydantoin) nucleus: a 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolinedione, 1-ethyl-3-phenyl-2,4-imidazolidinedione, 1-ethyl-2-α-napthyl-2,4-imidazolidinedione, 1,3-diphenyl-2,4-imidazolidinedione, etc.); a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(2-carboxyethyl)-2-thio-2,4-imidazolidinedione, 3-phenyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-naphthyl-2-thio-2,4-imidazolidinedione, 1,3-diphenyl-2-thio-2,4-imidazolidinedione, etc.); a 2-imidazolin-5-one nucleus.

G represents a substituted or unsubstituted amino radical (e.g., primary amino, anilino), or a substituted or unsubstituted aryl radical (e.g., phenyl, naphthyl, dialkylaminophenyl, tolyl, chlorophenyl, nitrophenyl).

According to formulas (I)–(V), each L represents a substituted or unsubstituted methine group. Examples of substituents for the methine groups include alkyl (preferably of from 1 to 6 carbon atoms, e.g., methyl, ethyl, etc.) and aryl (e.g., phenyl). Additionally, substituents on the methine groups may form bridged linkages.

X represents a cation as necessary to balance the charge of the dye molecule. Such cations are well-known in the art. Examples include sodium, potassium, triethylammonium, and the like.

The other of $R_1$ and $R_2$ may also be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., 2-hydroxyethyl, 4-hydroxybutyl, etc., an alkoxyalkyl group, e.g., 2-methoxyethyl, 4-butoxybutyl, etc., a carboxyalkyl group, e.g., 2-carboxyethyl, 4-carboxybutyl, etc.; a sulfoalkyl group, e.g., 2-sulfoethyl, 3-sulfobutyl, 4-sulfobutyl, etc., a sulfatoalkyl group, e.g., 2-sulfatoethyl, 4-sulfatobutyl, etc., an acyloxyalkyl group, e.g., 2-acetoxyethyl, 3-acetoxypropyl, 4-butyryloxybutyl, etc., an alkoxycarbonylalkyl group, e.g., 2-methoxycarbonylethyl, 4-ethoxycarbonylbutyl, etc., or an aralkyl group, e.g., benzyl, phenethyl, etc. The alkyl or aryl group may be substituted by one or more of the substituents on the above-described substituted alkyl groups.

In formula (I) and (IV), at least one of $R_1$ and $R_2$ is represented by the formula below. As there is no $R_2$ in formulas (II), (III), and (V), $R_1$ in formulas (II) and (III) is represented by this formula:

L' and L'' are each independently a substituted or unsubstituted linking group of 1 to 6 carbon atoms. Examples of such linking groups include —CH$_2$—, —CH$_2$CH$_2$—, —CH$_2$CH$_2$CH$_2$—, —CH$_2$CH$_2$CH$_2$CH$_2$—, —(CH$_2$)$_5$—, —(CH$_2$)$_6$—, —CH$_2$CH$_2$—O—CH$_2$CH$_2$—,

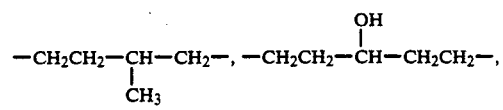

—CH$_2$—CH=CH—, and —CH$_2$—C≡C—.

R is preferably H, and may also be substituted or unsubstituted alkyl. Such alkyl groups are preferably from 1 to 6 carbon atoms. Examples of substituted or unsubstituted alkyl groups useful as R include —CH$_3$, —CH$_2$CH$_3$, and —CH$_2$—CH=CH$_2$. R can also form, together with L' or L'', a 5- or 6-membered ring structure.

Examples of compounds according to formulas (I)–(V) include:

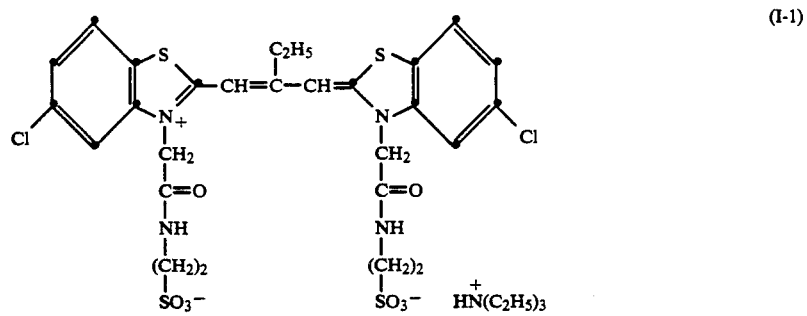

(I-1)

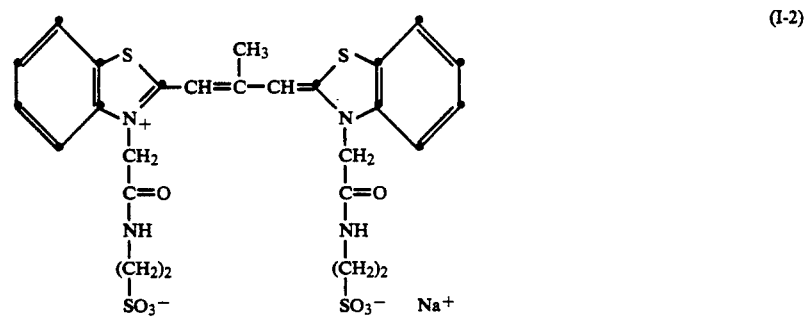

(I-2)

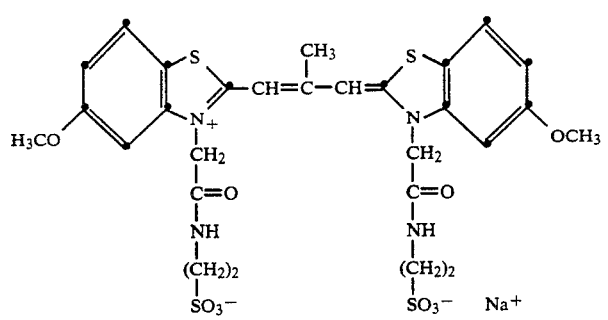
(I-3)
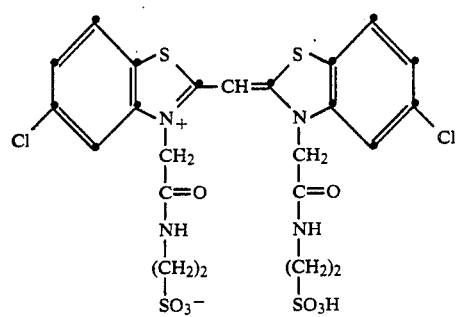
(I-4)
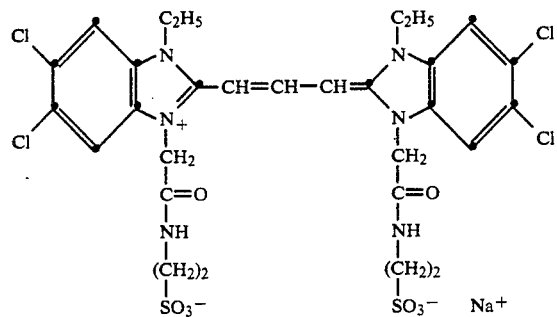
(I-5)
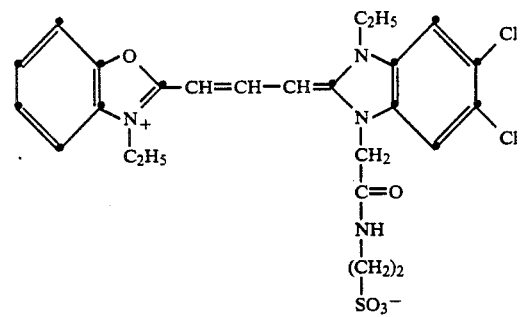
(I-6)
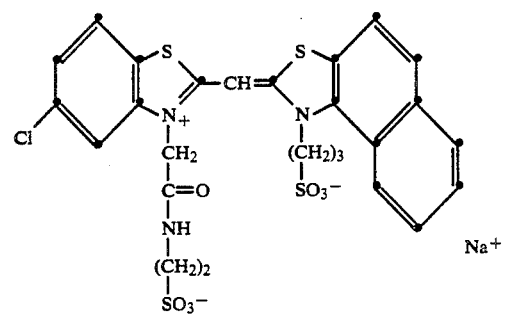
(I-7)

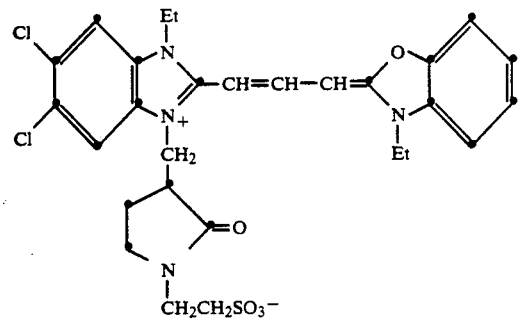 (I-8)
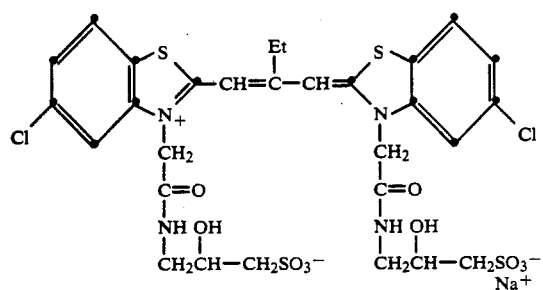 (I-9)
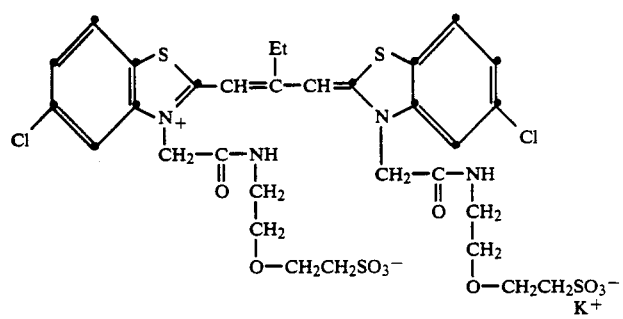 (I-10)
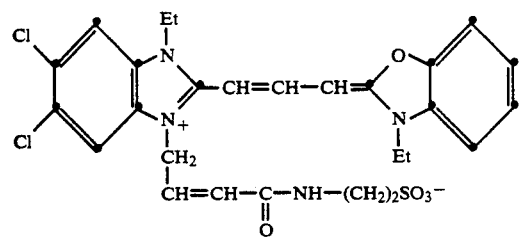 (I-11)
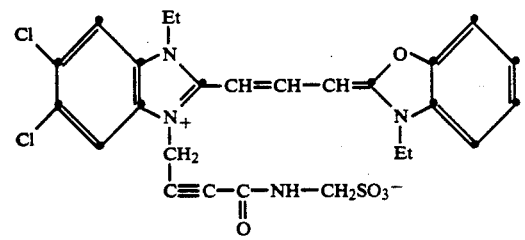 (I-12)
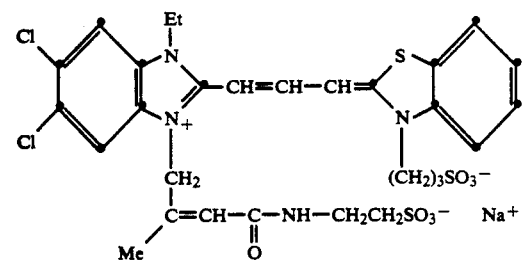 (I-13)

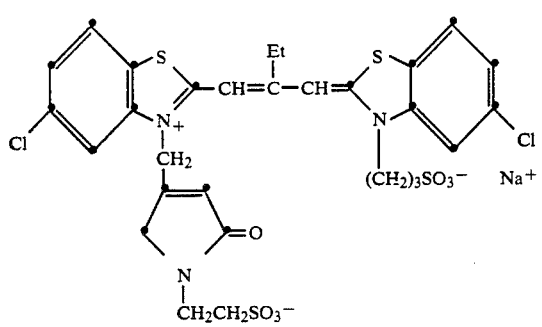
(I-14)
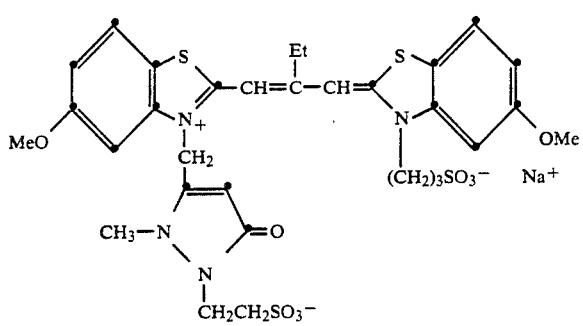
(I-15)
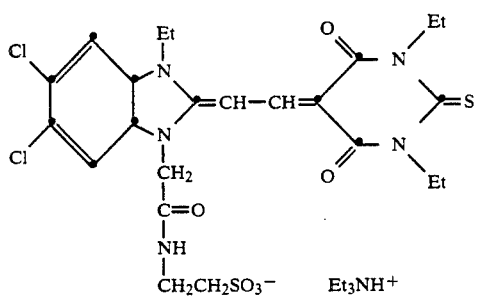
(II-1)
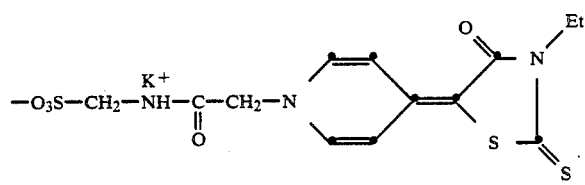
(II-2)
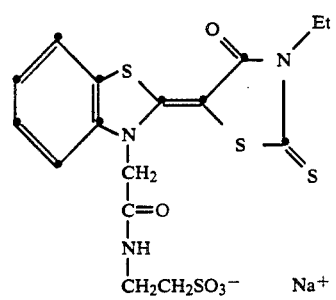
(II-3)

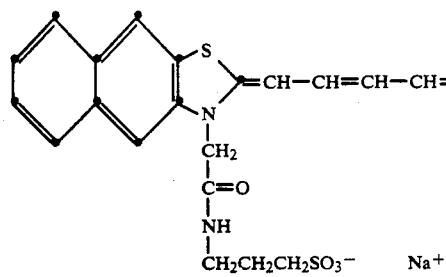
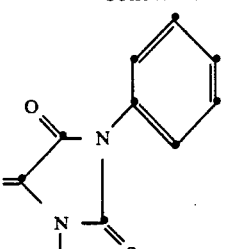 (II-4)
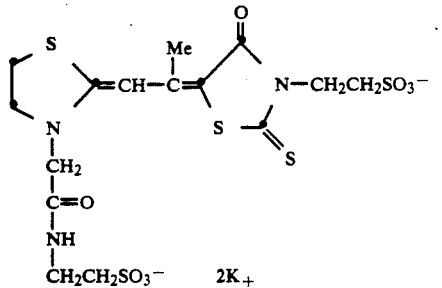 (II-5)
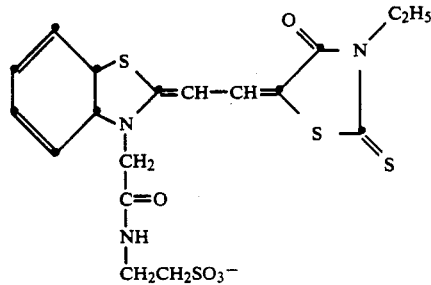 (II-6)
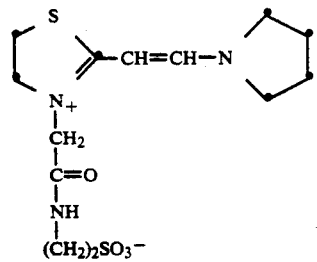 (III-1)
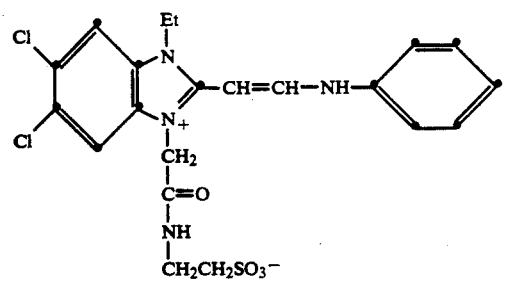 (III-2)
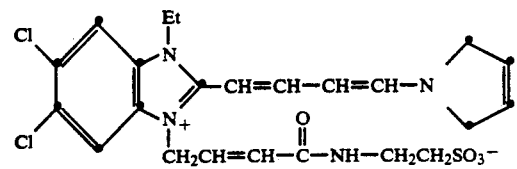 (III-3)

-continued
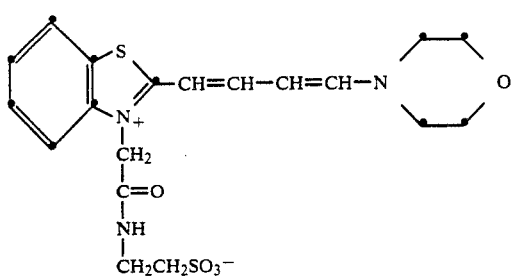 (III-4)
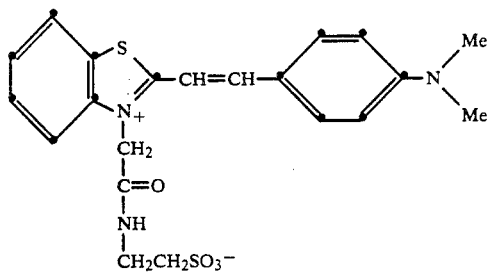 (III-5)
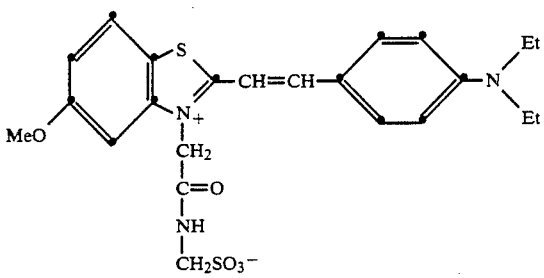 (III-6)
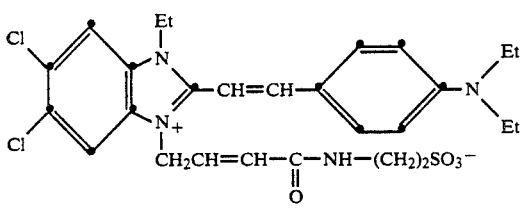 (III-7)
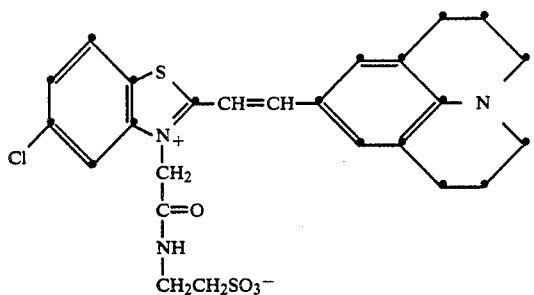 (III-8)
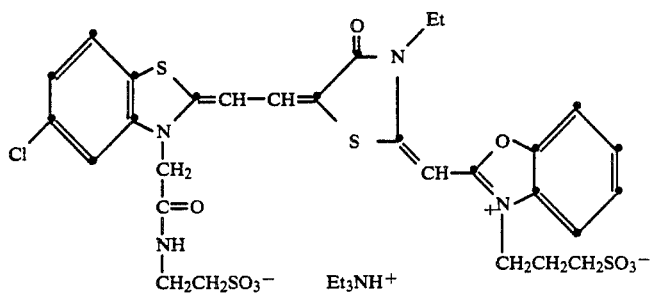 (IV-1)

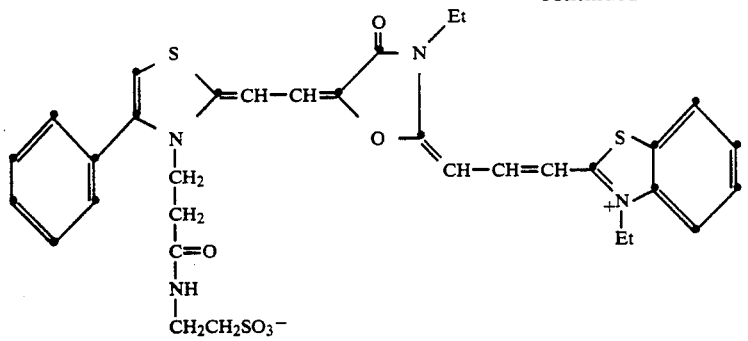
(IV-2)
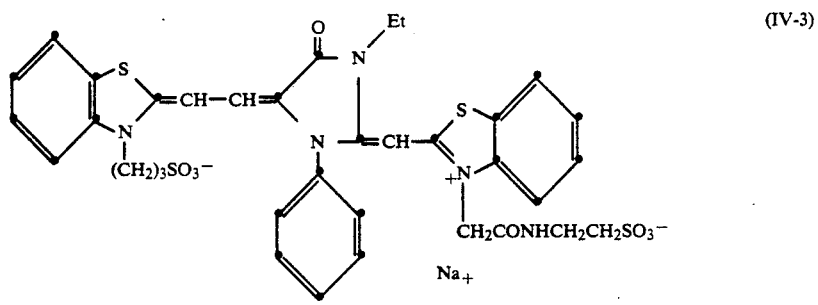
(IV-3)
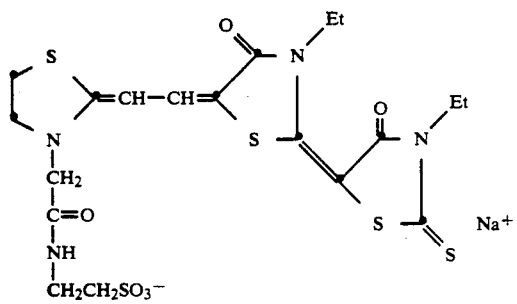
(V-1)
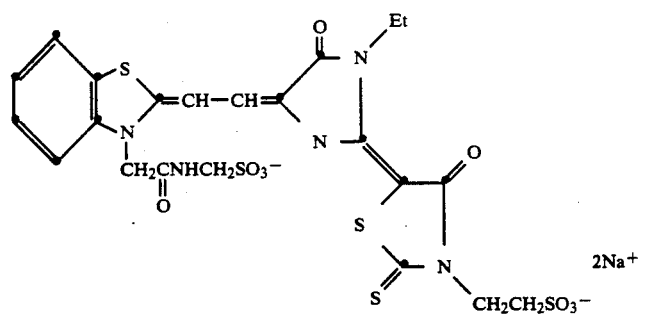
(V-2)
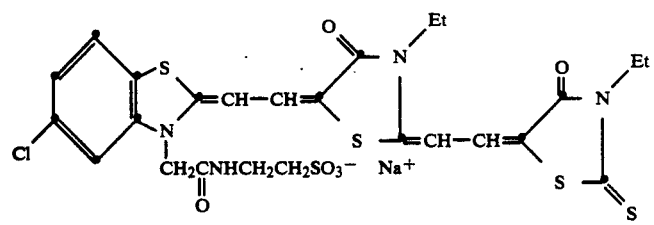
(V-3)
An example of a general way in which the substituents of the invention can be incorporated into sensitizing dyes is to make an alkylating agent such as
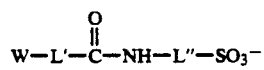
(A)
where W is a leaving group such as halide (bromo, chloro, iodo), or alcohol derivative such as tosylate, triflate, p-nitrobenzenesulfonate. Compound (A) can be formed in many different ways, for instance condensation of an acid halide (B) where X is a halide with a sulfo substituted amine (C).

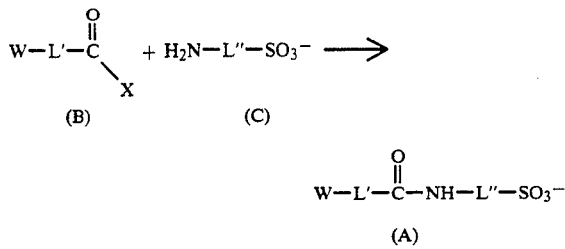

Reaction of (A) with a heterocyclic base affords a quaternary salt. The formation of dyes from quaternary salts is well-known in the art.

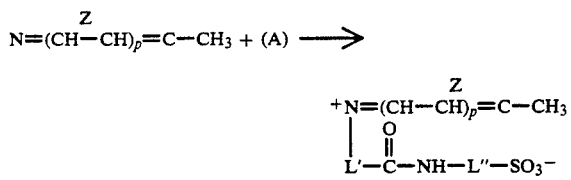

The dyes of formulas (I)-(V) can be prepared according to techniques that are well-known in the art, such as described in Hamer, *Cyanine Dyes and Related Compounds*, 1964 and James, *The Theory of the Photographic Process* 4th, 1977.

The amount of sensitizing dye that is useful in the invention is preferably in the range of 0.1 to 1.0 millimoles per mole of silver halide and more preferably from 0.2 to 0.7 millimoles per mole of silver halide. Optimum dye concentrations can be determined by methods known in the art.

The silver halide used in the practice of the invention can be of any known type, such as silver bromoiodide, silver bromide, silver chloride, silver chlorobromide, and the like. In a preferred embodiment, the dye is used to sensitize silver halide emulsions that are high in chloride, preferably above about 80 mole percent and more preferably above about 95 mole percent. Such high-chloride emulsions are often subjected to rapid processing, which further increases the need for low-staining dyes.

The type of silver halide grain used in the invention is not critical and essentially any type of silver halide grains can be used in the practice of the invention, although since the dye is lower stain than prior art aggregating dyes, it may be advantageously used in combination with tabular grain emulsions, which have greater surface area, allowing for greater amounts of dye to be used, which can aggravate dye stain problems. Tabular silver halide grains are grains having two substantially parallel crystal faces that are larger than any other crystal face on the grain. Tabular grain emulsions preferably have at least 50% of the grain population accounted for by tabular grains that satisfy the formula AR/t>25. In this formula, AR stands for aspect ratio, which equals D/t. D is the diameter of the grain in micrometers and t is the thickness of the grain between the two substantially parallel crystal faces in micrometers. The grain diameter D is determined by taking the surface area of one of the substantially parallel crystal faces, and calculating the diameter of a circle having an area equivalent to that of the crystal face. The grain size of the silver halide may have any distribution known to be useful in photographic compositions, and may be either polydisperse or monodisperse.

The silver halide grains to be used in the invention may be prepared according to methods known in the art, such as those described in *Research Disclosure*, Item 308119, December, 1989 [hereinafter referred to as *Research Disclosure I*] and Mees, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The silver halide may be sensitized by the dye of formula (I) by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (e.g., 2 hours).

The above-described sensitizing dye can be used by itself to sensitize silver halide, or it may be used in combination with other sensitizing dyes to provide the silver halide with sensitivity to broader or different ranges of wavelengths of light than silver halide sensitized with a single dye or to supersensitize the silver halide.

In a preferred embodiment of the invention, the dye of formulas (I)-(V) is used to sensitize silver halide in photographic emulsions, which can be coated as layers on photographic elements. Essentially any type of emulsion (e.g., negative-working emulsions such as surface-sensitive emulsions or unfogged internal latent image-forming emulsions, direct-positive emulsions such as surface fogged emulsions, or others described in, for example, *Research Disclosure I*.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in Research Disclosure, June, 1975, item 13452 and U.S. Pat. No. 3,772,031.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion may also include brighteners, such as stilbene brighteners. Such brighteners are well-known in the art and are used to counteract dye stain, although the dyes of formula (I)-(V) offer reduced dye stain even if no brightener is used.

The emulsion layer containing silver halide sensitized with the dye of formulas (I)-(V) can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. The photographic composition of the invention can be utilized in any color-sensitive layer of a color photographic element having a dye-forming color coupler associated therewith. These color image-forming couplers along with other element configurations are well-known in the art and are disclosed, for example, in *Research Disclosure* I.

Photographic elements comprising the composition of the invention can be processed in any of a number of well-known photographic processes utilizing any of a number of well-known processing compositions, described, for example, in *Research Disclosure* I or in James, *The Theory of the Photographic Process* 4th, 1977. Elements having high chloride silver halide photographic compositions are especially advantageously processed by fast processes utilizing a so-called rapid access developer.

The invention is described further in the following Examples.

SYNTHESIS EXAMPLE 1—Synthesis of Dye I-2

Step A—Preparation of Bromoacetyltaurine Sodium Salt

Taurine (50 g, 0.40 mol) and sodium carbonate (48 g, 0.45 mol) were combined with 250 mL of water in a 1-L flask and chilled in an ice bath (10° C.). Bromoacetyl bromide (100 g, 0.50 mol) in 250 mL of methylene chloride was added dropwise over a 1 hr period with rapid stirring while maintaining the temperature at 10°-15° C. After addition, the ice bath was removed and the mixture was stirred for 3 hr. The aqueous layer was separated and washed with two portions of methylene chloride, and most of the water was evaporated affording a moist white solid. The solid was washed thoroughly with acetone and dried (90 g, 85% yield). The product was purified by dissolving it in 1200 mL of hot methanol, filtering, and evaporating the methanol until the product crystallized out (volume ca 650 mL). This afforded 47 g (44% yield) of product; mp>250° C. Anal. Calcd. for $C_4H_7BrNO_4SNa$: C, 17.9; H, 2.6; N, 5.4. Found: C, 17.6; H, 2.4; N, 4.5.

Step B—Peparation of Anhydro-2-methyl-3-(2-sulfoethylcarbamoylmethyl)-benzothiazolium hydroxide 2-Methylbenzothiazole (9.0 g, 0.06 mol) and bromoacetyltaurine sodium salt (8.1 g, 0.03 mol) were combined in 50 mL of sulfolane and heated at 180° C. for 45 min. After cooling, the product was collected, washed with ethanol and recrystallized from acetone/methanol, affording 2.4 g (25% yield) of product; mp>250° C. Anal. Calcd. for $C_{12}H_{14}N_2O_4S_2$: C, 45.8; H, 4.5; N, 8.9. Found: C, 45.5; H, 4.6; N, 8.8.

Step C—Preparation of Anhydro-9-methyl-3,3'-di-(2-sulfoethylcarbamoylmethyl)thiacarbocyanine hydroxide Sodium Salt (Dye I-2)

Anhydro-2-methyl-3-(2-sulfoethylcarbamoylmethyl)benzothiazolium hydroxide (2.0 g, 6.3 mmol) in 15 mL of m-cresol at 100° C. was combined with triethylorthoacetate (3.0 g, 18.5 mmol) and triethylamine (1.5 g, 15 mmol) with stirring for 20 min. The solid formed was collected, washed with acetone and recrystallized from methanol containing excess sodium acetate affording 0.3 g (14% yield) of dye; λ-max=554 nm (MeOH), ε-max=14.1×10$^4$. Anal. Calcd. for $C_{26}H_{27}N_4O_8S_4Na.H_2O$: C, 45.1; H, 4.2; N, 8.1. Found: C, 45.0; H, 4.1; N, 8.2.

SYNTHESIS EXAMPLE 2—Synthesis of Dye I-3

Step A—Preparation of Anhydro-5-methoxy-2-methyl-3-(2-sulfoethylcarbamoylmethyl)benzothiazolium hydroxide 5-Methoxy-2-methylbenzothiazole (8.1 g, 45.2 mmol) and bromoacetyltaurine sodium salt from Step A of Synthesis Example 1 (8.1 g, 30 mmol) were combined in 50 mL of sulfolane at 180° C. for 30 min. After cooling, acetone was added and the solid was collected and recrystallized from methanol/acetone affording 3.3 g (32% yield) of product, mp>208° C. (dec). Anal.

Calcd. for $C_{13}H_{16}N_2O_5S_2$: C, 42.5; H, 5.0; N, 7.6. Found: C, 42.1; H, 4.6; N, 7.9.

Step B—Preparation of Anhydro-9-ethyl-5,5'-methoxy-3,3'-di-(2-sulfoethylcarbamoylmethyl)thiacarbocyanine hydroxide Sodium Salt (Dye I-3)

Anhydro-5-methoxy-2-methyl-3-(2-sulfoethylcarbamoylmethyl)benzothiazolium hydroxide (2.0 g, 5.8 mmol), triethylorthopropionate (2.0 g, 11.4 mmol) and triethylamine (1.0 g, 10 mmol) were combined in 25 mL of m-cresol at 100°–110° C. with stirring for 20 min. After cooling the mixture was diluted with acetone and the solid was collected and recrystallized from methanol containing sodium acetate. This afforded 0.4 g (18% yield) of dye, λ-max=574 nm (90/10 methanol, water), ε-max=11.7×10⁴. Anal. Calcd. for $C_{29}H_{33}N_4O_{10}S_4$·Na·2H$_2$O: C, 44.4; H, 4.7; N, 7.1. Found: C, 44.5; H, 4.4; N, 7.0.

PHOTOGRAPHIC EVALUATION EXAMPLE 1

Black and white photographic materials were prepared by coating a polyester support with a silver halide emulsion layer containing chemically-sensitized 0.2 μm cubic silver bromoiodide (2.6 mole % I) at 10.8 mg Ag/dm², hardened gelatin at 73 mg/dm², and sensitizing dye as identified in the Table below at 0.8 mmole/mole Ag. The elements were given a wedge spectral exposure and processed in Kodak RP X-Omat ® processing. The sensitometric data is presented in the Table below. In this table, peak speed is defined as the speed at λ-max (in log E units multiplied by 100) minus the intrinsic speed of the dyed emulsion at 400 nm (in log E units multiplied by 100) plus 200. This measurement of speed allows for comparison of the spectral sensitivity provided by the dyes while using a uniform chemical sensitization that is not optimized for each sensitizing dye. Stain was measured by placing the processed film in front of a scanning spectrophotometer. The total transmission was measured between 400 nm and 900 nm. This data was plotted as absorbance (−log 1/T). The stain was then calculated as the maximum absorbance at any wavelength in the range.

Color photographic materials were prepared by coating a polyester support with a silver halide emulsion layer containing chemically-sensitized 0.8 μm cubic silver bromoiodide (3.6 mole % I) at 16 mg Ag/dm², hardened gelatin at 63 mg/dm² tetrazaindene antifoggant at 5 mg/dm², a coupler as shown below at 14 mg/dm², and sensitizing dye as identified in the Table below at 0.4 mmole/mole Ag. The elements were given a wedge spectral exposure and processed in Kodak C-41 ® processing. The resulting sensitometric data is presented in Table I below. Stain tendency was measured by processing unexposed material for 3.5 minutes at 33° C. in the processing solution described below, and values for stain were obtained as in the black and white example. Stain data is presented in Table I below.

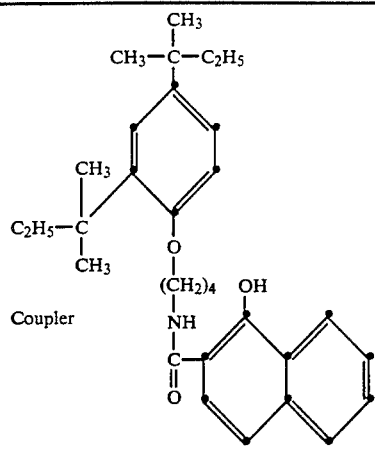

Coupler

| Processing solution | |
|---|---|
| benzyl alcohol | 14.2 ml |
| potassium carbonate | 28 g |
| 45% potassium sulfite | 2.75 ml |
| triethanolamine | 11 ml |
| hydroxylamine sulfate | 3.2 g |
| potassium bromide | 0.58 g |
| potassium chloride | 0.13 g |
| lithium chloride | 0.13 g |
| anticalcium agent | 0.8 ml |
| water to make | 1.0 l |
| pH adjusted to | 10.08 |

All of the dyes effectively sensitized the silver halide emulsions in which they were used. The stain data is presented in Table I below, where each dye of a formula according to the invention is paired with a comparison dye (shown below) differing only by the nitrogen substituents.

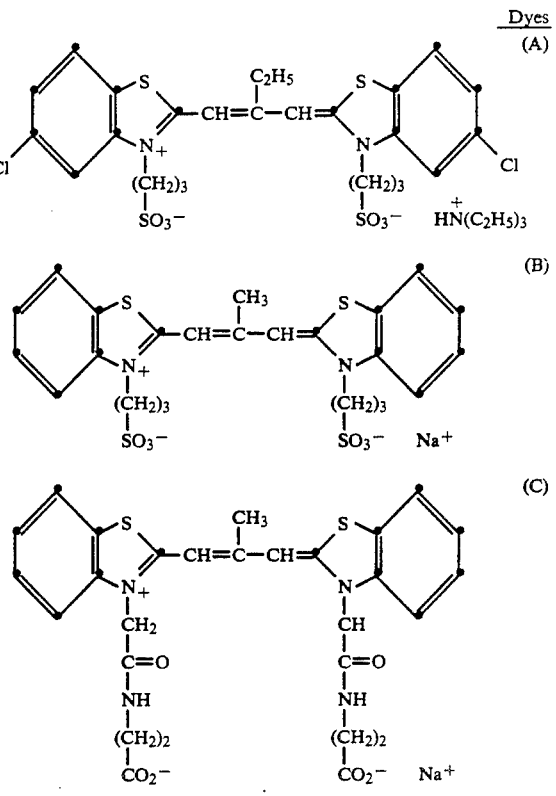

Dyes (A), (B), (C)

-continued

Dyes

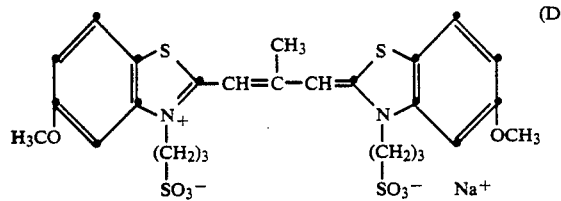
(D)

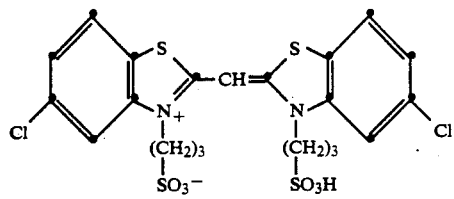
(E)

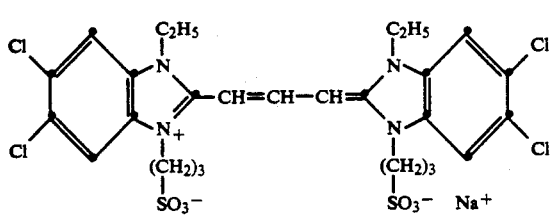
(F)

-continued

Dyes

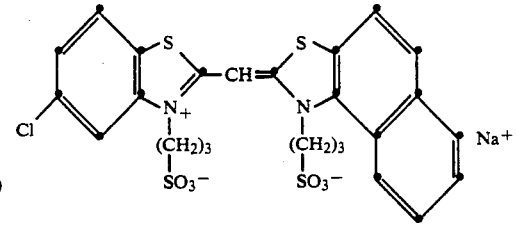
(H)

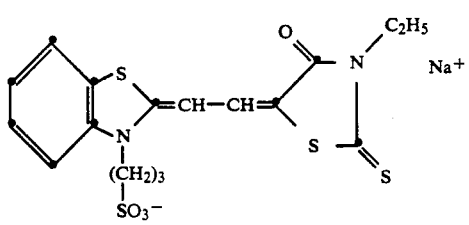
(I)

TABLE I

| | COLOR FORMAT | | | | B&W Format | | | |
|---|---|---|---|---|---|---|---|---|
| DYE | Sensitizing λ-Max | Sensitizing Ratio | Stain λ-Max | Stain OD × 10³ | Sensitizing λ-Max | Sensitizing Ratio | Stain λ-Max | Stain OD × 10³ |
| I-1 | 650 | 195 | 570 | 1 | 640 | 212 | 565 | 27 |
| A | 650 | 199 | 570 | 16 | 650 | 188 | 569 | 42 |
| I-2 | 540 | 193 | — | 0 | 550 | 218 | 555 | 27 |
| B | 590 | 177 | — | 0 | 590 | 218 | 550 | 36 |
| C | — | — | — | — | 550 | 195 | 550 | 35 |
| I-3 | 610 | 138 | — | 0 | 630 | 236 | 575 | 31 |
| D | 640 | 203 | 580 | 9 | 640 | 228 | 570 | 40 |
| I-4 | 460 | 198 | — | 0 | 470 | 193 | 432 | 19 |
| E | 470 | 197 | — | 0 | 470 | 230 | 465 | 83 |
| I-5 | 580 | 235 | 525 | 17 | 580 | 254 | 525 | 13 |
| F | 580 | 220 | 585 | 100 | 580 | 223 | 570 | 13 |
| I-6 | 530 | 172 | 495 | 25 | 530 | 240 | 495 | 31 |
| G | 530 | 175 | 495 | 40 | 540 | 227 | 495 | 28 |
| I-7 | 480 | 212 | 450 | 9 | 480 | 227 | 445 | 27 |
| H | 470 | 194 | 450 | 16 | 480 | 222 | 480 | 49 |
| II-6 | — | — | — | — | 590 | 178 | 535 | 35 |
| I | — | — | — | — | 590 | 172 | 535 | 42 |

The speed of the processed coatings is measured every 10 nm at 0.3 above Dmin.
Sensitizing Ratio = 100× the logarithm of the speed at the wavelength of maximum sensitivity minus 100× the logarithm of the speed at 400 nm plus 200.
Stain is given as optical density measured spectrophotometrically × 1000.

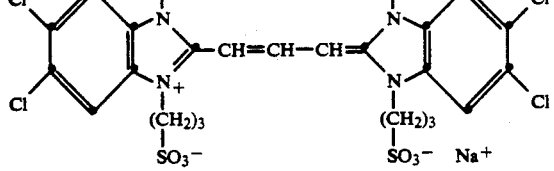

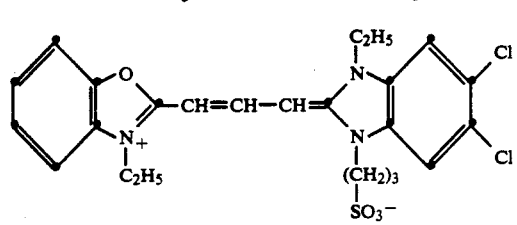
(G)

The data presented in Table I indicate that the dyes used according to the invention gave significantly lower post-processing stain than the comparison dyes.

The invention has been described in detail with particular reference to preferred embodiments thereof, but it will be understood that variations and modifications can be effected within the spirit and scope of the invention.

What is claimed is:

1. A photographic element comprising a support having thereon a silver halide emulsion layer sensitized with a dye according to any of the formulas:

$$R_1 \overset{+}{-} N \Rset{CH - CH \Rset{p}} C - L = C \Rset{CH = CH \Rset{q}} N - R_2, \quad (I)$$

$$R_1 - N \Rset{CH = CH \Rset{p}} C \Rset{L - L \Rset{n-1}} D, \quad (II)$$

$$R_1 \overset{+}{-} N \Rset{CH - CH \Rset{p}} C \Rset{L = L \Rset{n-1}} G \quad (III),$$

-continued

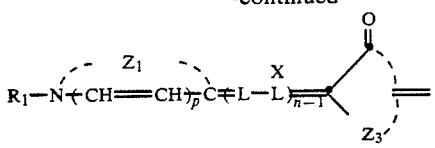
(IV)

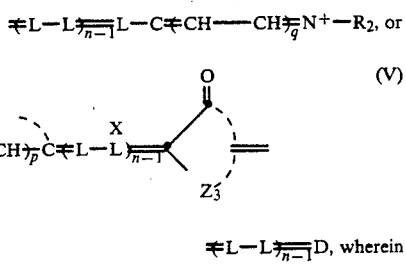
(V)

, wherein

Z and Z' each independently represent the atoms necessary to complete a substituted or unsubstituted thiazole nucleus, a substituted or unsubstituted selenazole nucleus, a substituted or unsubstituted imidazole nucleus, or a substituted or unsubstituted oxazole nucleus, $Z_1$, $Z_2$, and $Z_3$ each independently represents the atoms necessary to complete a substituted or unsubstituted heterocyclic nucleus, each L independently represents a substituted or unsubstituted methine group, n is a positive integer of from 1 to 4, p and q each independently represents 0 or 1, X represents a cation as needed to balance the charge of the molecule, $R_1$ and $R_2$ each independently represents substituted or unsubstituted alkyl or substituted or unsubstituted aryl, and at least one of $R_1$ and $R_2$ is represented by the formula:

$$-L'-\overset{O}{\underset{\|}{C}}-\overset{R}{\underset{|}{N}}-L''-SO_3^-,$$

L' represents a substituted or unsubstituted divalent linking group comprising about 1 to 6 carbon atoms, L'' represents a substituted or unsubstituted divalent linking group comprising about 1 to 6 carbon atoms, R represents H, substituted or unsubstituted alkyl, or forms a ring structure with L' or L'', =D represents

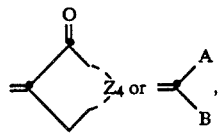

wherein $Z_4$ represents the atoms necessary to complete a substituted or unsubstituted heterocyclic nucleus, A and B each independently represents a cyano radical, an ester radical, an acyl radical, a carbamoyl radical, or an alkylsulfonyl radical, and G represents a substituted or unsubstituted aryl radical or a substituted or unsubstituted amino radical.

2. A photographic element according to claim 1 wherein the silver halide emulsion comprises at least about 80 mole percent silver chloride.

3. A photographic element according to claim 1 wherein the silver halide emulsion comprises at least about 95 mole percent silver chloride.

4. A photographic element according to claim 1 wherein the silver halide emulsion is a tabular grain emulsion wherein at least 50% of the grain population is accounted for by tabular grains that satisfy the formula AR/t>25, wherein AR represents the aspect ratio of the grain and t represents the thickness of the grain in micrometers.

5. A photographic element according to any of claims 1-4 wherein $R_1$ and $R_2$ are each independently represented by the formula:

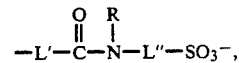

wherein

L' represents a substituted or unsubstituted divalent linking group comprising about 1 to 6 carbon atoms, L'' represents a substituted or unsubstituted divalent linking group comprising about 1 to 6 carbon atoms, and R represents H, substituted or unsubstituted alkyl, or forms a ring structure with L' or L''.

6. A photographic element according to any of claims 1-4 wherein R represents H.

7. A photographic element according to any of claims 1-4 wherein said dye is according to formula (I).

8. A photographic element according to claim 7 wherein at least one of $Z_1$ and $Z_2$ is a substituted or unsubstituted: thiazole nucleus, selenazole nucleus, or imidazole nucleus, and the $R_1$ or $R_2$ substituent attached to said substituted or unsubstituted: thiazole nucleus, selenazole nucleus, or imidazole nucleus is represented by the formula:

wherein

L' represents a substituted or unsubstituted divalent linking group comprising about 1 to 6 carbon atoms, L'' represents a substituted or unsubstituted divalent linking group comprising about 1 to 6 carbon atoms, and R represents H, substituted or unsubstituted alkyl, or forms a ring structure with L' or L''.

* * * * *

UNITED STATES PATENT AND TRADEMARK OFFICE
CERTIFICATE OF CORRECTION

PATENT NO. : 5,091,298

DATED : February 25, 1992

INVENTOR(S) : Richard L. Parton, et al

It is certified that error appears in the above-identified patent and that said Letters Patent is hereby corrected as shown below:

Column 28, line 43, "$Z_1$ and $Z_2$" should read -- Z and Z' --.

Signed and Sealed this

Twenty-second Day of June, 1993

Attest:

MICHAEL K. KIRK

Attesting Officer

Acting Commissioner of Patents and Trademarks